Aug. 23, 1966 T. A. RATKOWSKI 3,268,012

DIGGER TEETH

Original Filed July 22, 1963

Inventor
Thomas A. Ratkowski
By Wallace, Kinzer & Dorn
Attorneys

Aug. 23, 1966 T. A. RATKOWSKI 3,268,012

DIGGER TEETH

Original Filed July 22, 1963

Inventor
Thomas A. Ratkowski
By Wallace, Kinzer & Dorn
Attorneys

Inventor
Thomas A. Ratkowski
By Wallace Kinzer & Dorn
Attorneys

United States Patent Office 3,268,012
Patented August 23, 1966

3,268,012
DIGGER TEETH

Thomas A. Ratkowski, Chicago Heights, Ill., assignor to Abex Corporation, a corporation of Delaware Original application July 22, 1963, Ser. No. 296,522. Divided and this application Sept. 7, 1965, Ser. No. 485,164
2 Claims. (Cl. 172—700)

This application is a divisional application of co-pending application Serial No. 296,522, filed July 22, 1963), and entitled "Digger Teeth."

This invention relates to a digger shank assembly such as that used for supporting a digger tooth used in trenching, ripping and excavating operations.

The digger tooth and shank assembly of the kind contemplated in the present invention is used primarily in connection with ripping or trenching operations wherein the tooth, carried by the shank assembly is caused to penetrate the earth and then is pushed or pulled therethrough bringing the shank also into engagement with the earth. It will be realized that the working forces involved are quite tremendous and that the digger tooth and the leading ground-engaging surface on the shank are subjected to considerable wear, particularly where rocky soil is involved. Accordingly, one of the primary objects of the present invention is to protect the leading surface of a shank against wear by a novel protective shroud which can be replaced after it has undergone excessive wear. Thus, rather than replacing a complete shank due to wear at the leading surface, only the protective shroud is replaced. The construction of the protective shroud facilitates replacement as will be explained.

Another object of the present invention is to secure the shroud to the shank so that the shroud remains in place under the most severe operating conditions and still can be readily replaced in the field with equipment normally present at the excavation.

The digger tooth and shank are of relatively narrow width and the shroud is preferably of the same width as the shank so that it does not provide additional resistance to movement through the earth.

Other and further objects of the present invention will be apparent from the following description and claims and are illustrated in the accompany drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

Figures 1, 2, 2A:
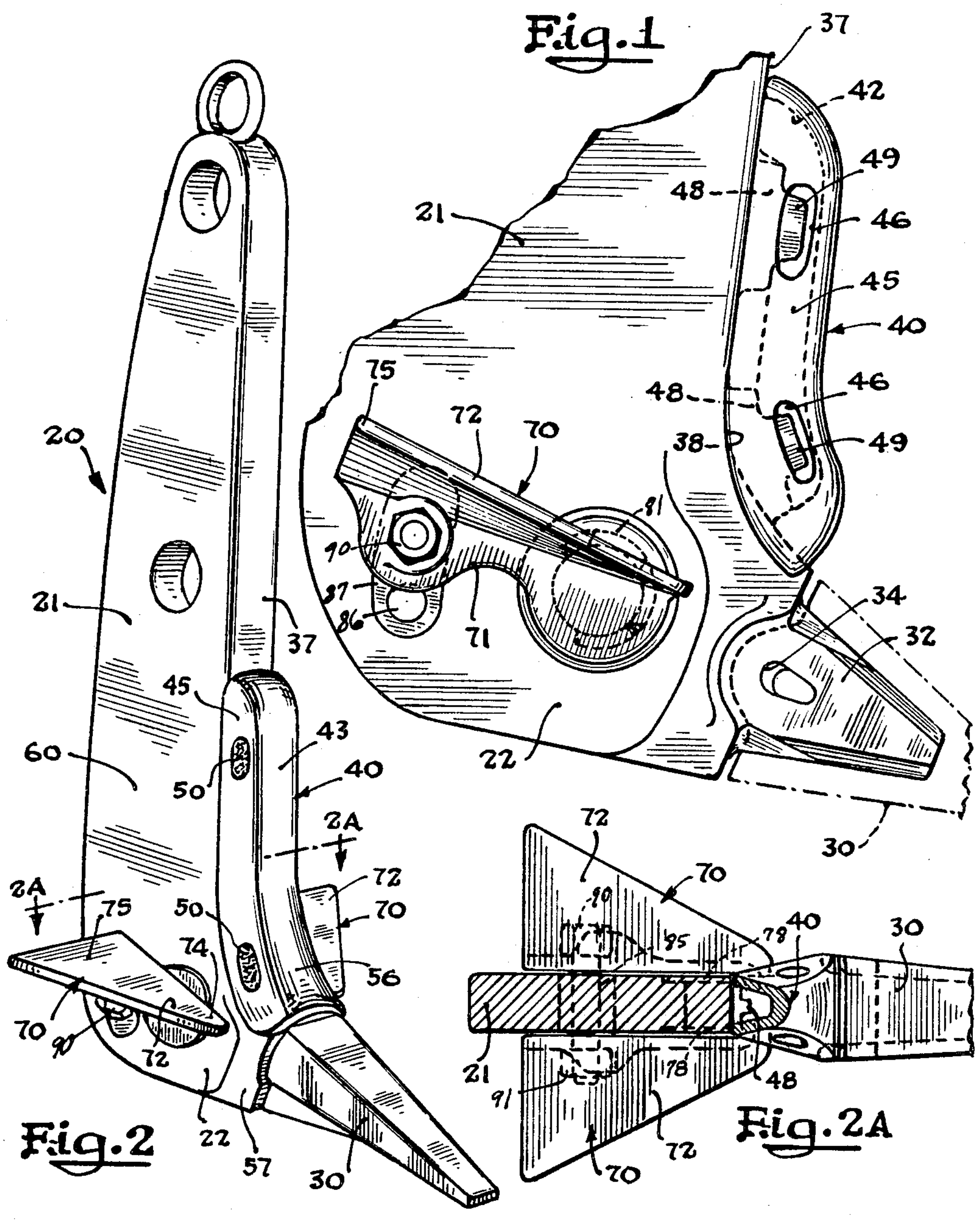
FIG. 1 is an enlarged elevational view showing a shroud and vanes secured on the shank according to the preferred embodiment of the invention.
FIG. 2 is a perspective view showing the shank assembly and digger tooth attached thereto with the shroud and vanes attached to the shank.
FIG. 2A is a section view taken along the lines 2A—2A in FIG. 2 in the direction of the arrows showing the vanes mounted on the shank.
Figure 4:
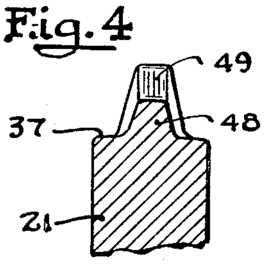
FIG. 4 is a sectional view taken along the line 4—4 in FIG. 3 in the direction of the arrows showing the cross sectional shape of the boss on the shank.

Referring now to the drawings and more particularly to FIG. 2, there is shown a digger shank assembly 20 having a shank 21 terminating in a lower foot 22 to which is secured a forwardly extending pointed digger or ripper tooth 30. More specifically, foot 22 of the shank 21 terminates in a tapered adapter 32, FIG. 1, integrally formed on the end of the foot 22 for insertion in a complementary shaped seat or opening formed in the tooth 30, the tooth 30 being also known in the art as a point or cap. To secure the tooth 30 to the adapter 32, the tooth 30 has an opening therethrough that registers with a like opening 34 in the adapter for receiving a wedge-shaped key driven through the registered openings to secure the tooth 30 to the shank 21 in a conventional manner. A more detailed disclosure of the adapted and the tooth is set forth in Patent No. 3,196,956.

In operation, the tooth 30 is driven into the ground and begins to rip or pierce the earth beneath the surface of earth forwardly at the foot portion 22 and shank 21 rips and tears the earth immediatly above and to the rear of the earth being pierced by the tooth 30. A leading side wall 37 of the shank 21, particularly at the lower portion thereof near the foot 22, bears the brunt of the ripping force and is subjected to considerable wear and pounding by the earth and impinging thereagainst.

While it has long been recognized in the art that the teeth 30 become worn and are made to be replaceable or repairable, the art has been lacking an effective protective device that permits longer use of the shank even though it is being subjected to continual hard wear. The present invention contemplates the protective covering of the lower and curved portion 38 of the front side wall 37 of the shank 21 by a protective cover or shroud 40 so that as the shroud becomes worn due to abrasion it can be removed and replaced by a new protective shroud 40 without necessary replacement of the entire shank 21, which is, manifestly, a more expensive arrangement.

Figure 3:
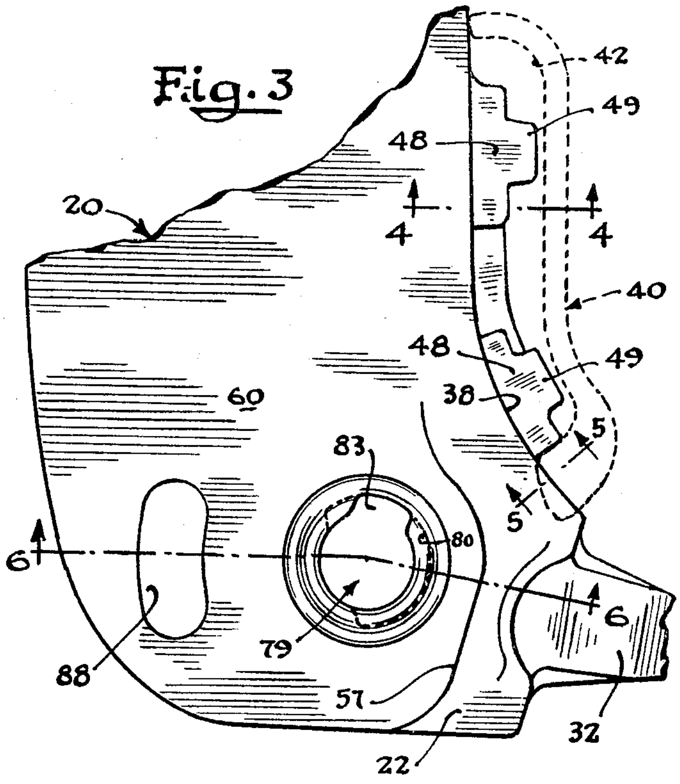
FIG. 3 is an enlarged view showing the openings within the shank and the bosses thereon over which the shroud is positioned.
Figure 5:
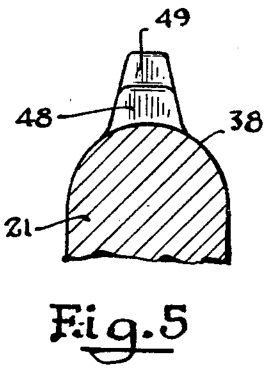
FIG. 5 is a sectional view taken along the line 5—5 in FIG. 3 in the direction of the arrows showing the integrally formed boss on the shank.
Figures 7, 8, 9:
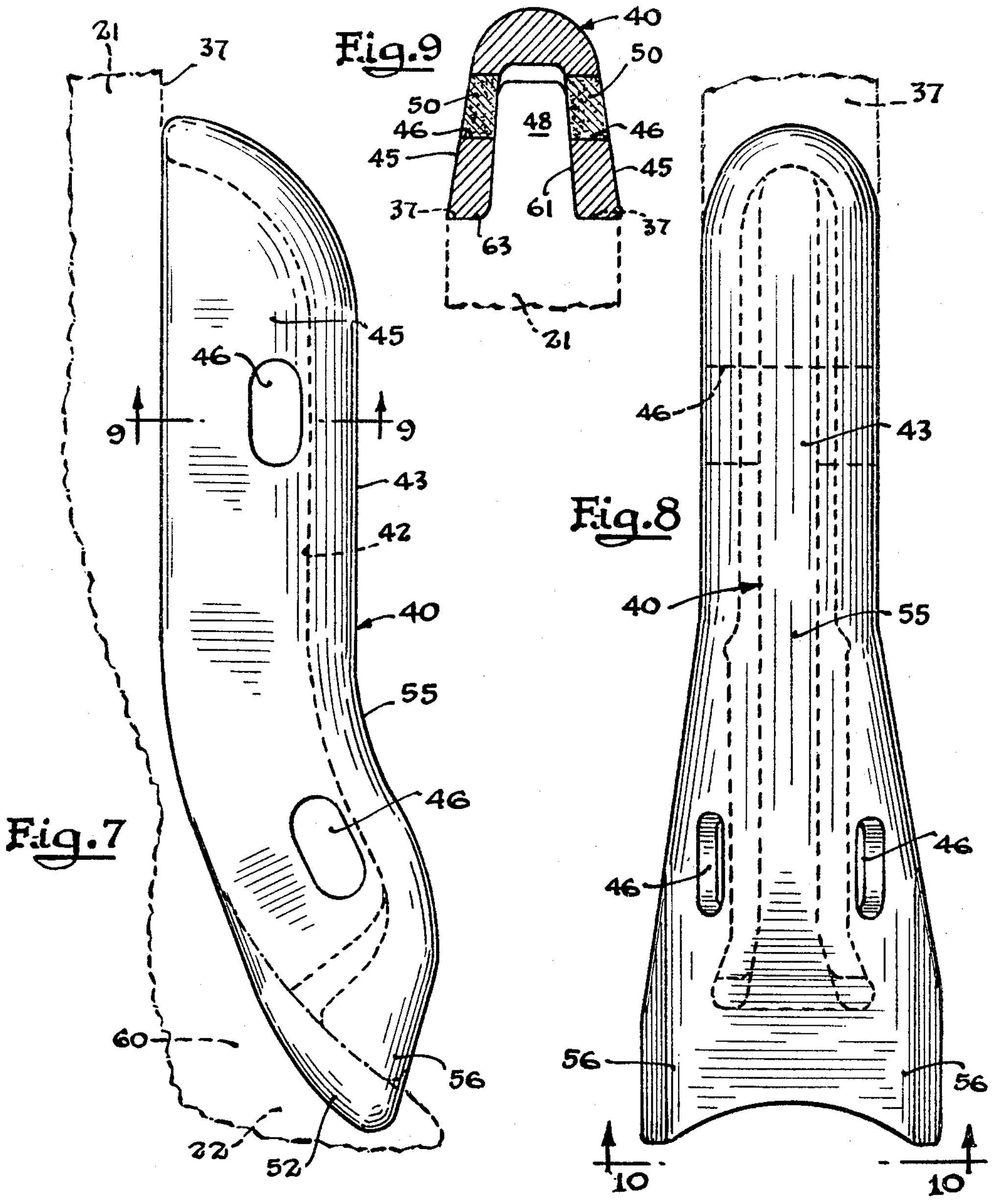
FIG. 7 is an enlarged side view showing the shroud and the opening therein.
FIG. 8 is a front view of the shroud showing the configuration thereof.
FIG. 9 is a sectional view taken along the line 9—9 in FIG. 7 in the direction of the arrows showing the shroud and weld for attaching the shroud to the boss on the shank.

The protective shroud 40 has a hollow shell-like, external body having a wall thickness as shown by the dotted line 42 in FIGS. 1, 3 and 7, and the shroud 40 is of a material capable of withstanding abrasion and shock and also of sufficient hardness and toughness to resist wear under the most extreme digging conditions. The shell 40, as shown in the drawings, has a forward leading wall 43 substantially of the same width as the leading wall 37 of the shank 21 so that the adapter 40 does not increase the width of the assembly being moved through the earth and thereby increasing the resistance of the shank 21 to being pulled or pushed through the earth.

It is important that the protective shroud 40 be secured to the shank 21 so as to hold the most severe operating conditions and still be readily secured thereto and removable therefrom on the site by operators having the usual construction tools. To this end, the opposed lateral side walls 45 of the shroud 40 are each provided with pairs of opposed openings 46 in each of the side walls 45, which openings 46 are aligned with integrally formed bosses 48 on the shank 21, as best seen in FIGS. 2 and 9. When the protective shroud 40 is properly positioned over the integral bosses 48 on the shank 21, the openings 46 in the side walls 45 of the shroud 40 are aligned with related, outwardly extending trapezoidal-shaped portions 49. These portions 49 of the bosses 48 act as a locating means in that the shroud is in proper position on the shank 21 when the portions 49 are aligned with the openings 46.

An operator secures the shroud 40 to the bosses 48 by welding the side walls along the opening 46 and the bosses 48 until the weld 50 completely fills the openings 46 as shown in FIG. 9, wherein the weld 50 is shown bonding the shroud 40 to the bosses 48 on the shank 21. Of course, it may not be necessary to completely fill the openings 46 when welding since a sufficient bond may be obtained without filling the opening 46. To remove a shroud 40, an operator need merely burn out the weld 50 in the opening 46.

Figure 6:
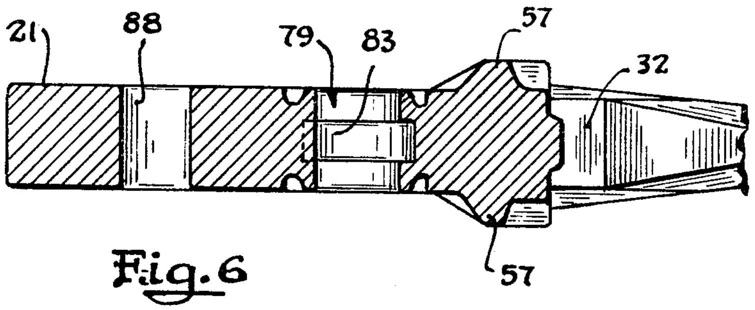
FIG. 6 is a sectional view taken along the line 6—6 in FIG. 3 in the direction of the arrows showing the configuration of the openings in the shank.
Figure 10:
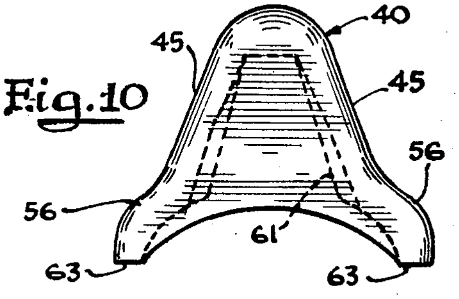
FIG. 10 is an end view taken along the line 10—10 in FIG. 8 in the direction of the arrows showing the end portion of the shroud.

Turning now to consideration of the configuration of the shroud 40, as best seen in FIGS. 7 to 10 inclusive, the shorud 40 is shown to be substantially of the same width as the width of the leading wall 37 of the shank 21 at its upper portion and then at approximately the point of curvature 55 the walls of the shroud 40 flare outwardly to a wider width to a lower covering portion 56, FIGS. 2 and 10, which portion is of sufficient width to extend over the leading wall 37 of the shank and cover a portion of the side walls 60 adjacent the foot 22 of the shank 21 as will be evident in FIG. 7. As best seen in FIG. 6, the thickness of the shank 21 increases at the foot 22, and the foot 22 has integrally formed outwardly extending shoulders 57 that increase the thickness of the foot 22 where the covering portion 56, FIG. 7, overlaps the side walls 60 of the shank 21. The shoulders 57 form a hollow depression into which fits the lower covering portion 56 of the shroud 40. Thus, the shroud 40 does not increase the overall or maximum thickness of the shank assembly 20 even at its widest portion, namely, the covering portion 56 for the side walls 60 at the foot 22 of the shank 21.

Referring to FIGS. 9 and 10, it will be seen that the hollow interior of the shroud 40 is a trapezoidally shaped cavity which engages and receives support from the trapezoidal shaped bosses 48 formed on the shank 21. The outer surface of the shroud 40 is rounded or hemispherically shaped from which extend in a divergent fashion, the outward side walls 45 referred to above and which terminate in end walls 63 adapted to abut the leading face 37 of the shank 21. Thus, when the end walls 63 are abutted against the leading face 37 and the openings 46 in the walls 45 of the shroud 40 are aligned with the outwardly extending portions 49 on the bosses 48, the operator will know that the shroud 40 is properly positioned on the shank 21 and will realize that he can weld the shroud 40 in place.

It is contemplated that the digger shank assembly 20 will have a protective shroud 40 during all operations, but only when it is decided that additional lifting or breaking of the earth is required, will the digger shank assembly 20 have a pair of removable vanes 70, FIG. 1, secured to the side walls 60 of the shank 21 at a selected pitch in order to achieve the desired amount of lift. The vanes 70 are mirror images of one another and are secured on opposite sides of the shank 21 in the same manner, so that the following description of the geometric configuration of one vane and its manner of attachment to the vane 20 is sufficient to aid in the understanding of the geometric configuration and the manner of securing its opposite vane.

As seen in FIG. 1, the vane 70 has a vertical side wall 71 mounted in flush engagement with the side wall 60 of the shank 21. Integrally formed and projecting normally outwardly of the vertical side wall 71 of the vane 70 is a triangular shaped wing 72 which has a rounded and forward nose portion 74 leading in the rearward direction to an increasingly outwardly extending wide rear portion 75.

The present invention involves a novel manner of securing the vanes 70 to the shank 21 to assure that the vanes are securely held in position, but the vanes 70 are readily rotatable to any one of a plurality of positions within a few degrees of one another. More specifically, it has been found desirable to have the vanes 70 adjustable within four 10° increments.

To rotatively mount the vanes 70 to the shank 21, the vertical side wall 71 of each vane 70 has an integrally formed, projecting boss 78 thereon for insertion in a forward opening 79, FIG. 3, in the foot portion 22 of the shank 20.

As seen in FIG. 3, the opening 79 in the shank 21 has an internal circular cavity or keyway 80 of enlarged diameter for receiving a projection or key 81 on vane 70. Intersecting the keyway 80 at right angles thereto is a channel or slot 83, FIG. 3, connecting the keyway 80 to the outer side wall 60 of the shank 21 and this channel 83 serves as an opening through which the key 81 can be inserted when the vane 70 is turned to an approximately vertical position with the pointed nose 74 of the vane 70 extending upwardly. Thus, to secure a vane 70 to the shank 21, the operator places the vane 80 in an approximately vertical position with the pointed nose 74 thereof extending upwardly and then inserts the key 81 in the correspondingly-shaped, receiving channel 83 therefor. After insertion of the key 81 through the channel 83 into the keyway 80, the operator then rotates the rearward portion 75 of the vane 70 downward in the counterclockwise direction as viewed in FIG. 3 to a position wherein an aperture in the vertical wall 71 of the vane 70 is aligned with an opening 86 in a sector-shaped insert 87 carried in a complementary shaped opening 88 in the shank 21. It will be recognized that the wall 82 formed between the keyway 80 and the outer side wall 60 of the shank 21 prevents the key 81 from moving laterally unless it is aligned with the channel 83.

A bolt 90 is inserted through the aligned openings 85 and 86 in the vane 70 and insert 87, a nut 91 is threaded thereon to lock the vane 70 in a definite position.

From the foregoing, it will be apparent that the shank assembly, as hereinbefore described, greatly increases the usefulness of a digger shank assembly in that it prolongs the life of the shank subjected to the greatest wear and furthermore a protective shroud that is easily secured to the shank 21 and easily removable therefrom, but which will remain attached to the shank even though subjected to extreme forces.

Hence, while I have illustrated and described the preferred embodiments of the invention, it is to be understood that these are capable of variation and modification, and I therefore do not wish to be limited to the precise details set forth, but desire to avail myself of such changes and alterations as wall within the purview of the following claims.

I claim:

1. A replaceable shroud for protecting the leading and ground breaking wall of a shank of a digger assembly adjacent an attached digger tooth secured to the shank, said shank having at least one integrally formed projection on its leading wall by which said shroud is secured to said shank, said shroud comprising:

a hollow shell member for covering said projection and the portion of said leading side wall of the shank adjacent said digger tooth, said shell having a forward leading wall and having opposed lateral side walls terminating in end walls for engaging the leading wall of said shank adjacent the outer edges of said side walls of said shank, and each of said lateral side walls having elongated apertures, said apertures having elongated side walls constituting elongated surfaces for welding said shroud to said shank, said elongated apertures adapted to expose said projection on said shank, access being provided through said apertures on said shroud for welding said shroud to said shank.

2. In combination with a digger shank, a replaceable shroud for protecting the leading and ground engaging wall of said shank, said shank having a substantially upright portion and a curved portion leading to a foot portion of increased thickness to which is attached a digger tooth, said shank having a plurality of forwardly extending projections thereon, said projections being spaced apart at a predetermined distance, said shroud comprising:

an upper portion of substantially the same width as the width of the leading ground engaging wall of said shank, a medial portion being of increasing width for covering the leading wall at said curved portion of said shank, a lower portion of said shroud covering the width of said leading edge of said shank at said foot portion of said shank and extending into engagement with the side walls of said foot portion of said shank, said shroud having a plurality of longitudinally extending recesses, said recesses being spaced on said shroud at said predetermined distance for alignment with said spaced projections to orient said shroud in position on said shank, said recesses for receiving a weld to bond said shroud to said shank whereby the thickness of said shroud is not increased by said weld.

References Cited by the Examiner

UNITED STATES PATENTS

| | | | |
|---|---|---|---|
| 3,001,591 | 9/1961 | Johnson | 172—700 |
| 3,171,500 | 3/1965 | Dils | 172—700 |

ABRAHAM G. STONE, *Primary Examiner.*

WILLIAM A. SMITH III, *Assistant Examiner.*